United States Patent
Selway

[19]

[11] Patent Number: 6,113,369
[45] Date of Patent: Sep. 5, 2000

[54] REED VALVE ARRANGEMENT AND GAS COMPRESSOR EMPLOYING A REED VALVE ARRANGEMENT

[75] Inventor: Martin Selway, Steyning, United Kingdom

[73] Assignee: Knorr-Bremse Systems For Commerical Vehicles Ltd., Bristol, United Kingdom

[21] Appl. No.: 09/120,296

[22] Filed: Jul. 22, 1998

[30] Foreign Application Priority Data

Jul. 26, 1997 [GB] United Kingdom .................... 9715742

[51] Int. Cl.[7] ...................................... F04B 39/10
[52] U.S. Cl. .......................... 417/569; 417/269; 417/751; 137/852; 137/859
[58] Field of Search ..................................... 137/852, 859, 137/855, 543.19, 512, 856; 417/269, 569, 751, 571, 415

[56] References Cited

U.S. PATENT DOCUMENTS

| | | |
|---|---|---|
| 2,043,849 | 6/1936 | Bixler . |
| 2,151,746 | 3/1939 | Cody . |
| 2,852,184 | 9/1958 | Stolte . |
| 3,807,430 | 4/1974 | Keller ........................................ 137/504 |
| 3,986,798 | 10/1976 | Lindell et al. . |
| 4,193,424 | 3/1980 | Hrabal . |
| 4,474,145 | 10/1984 | Boyesen .............................. 123/73 PP |
| 4,537,566 | 8/1985 | Blass et al. .............................. 417/569 |
| 4,642,037 | 2/1987 | Fritchman ............................... 417/571 |
| 5,165,449 | 11/1992 | Yoon ........................................ 137/851 |
| 5,178,183 | 1/1993 | Kim ........................................ 137/527 |
| 5,265,646 | 11/1993 | Richardson . |
| 5,266,016 | 11/1993 | Kandpal . |
| 5,454,397 | 10/1995 | Miszczak . |
| 5,456,287 | 10/1995 | Leu . |
| 5,558,508 | 9/1996 | Sasano et al. .......................... 417/569 |
| 5,586,874 | 12/1996 | Hashimoto et al. .................... 417/569 |
| 5,603,611 | 2/1997 | Tarutani et al. . |
| 5,655,898 | 8/1997 | Hashimoto et al. .................... 417/569 |
| 5,672,053 | 9/1997 | Sabha ..................................... 417/569 |
| 5,775,887 | 7/1998 | Park et al. .............................. 417/569 |
| 5,860,800 | 1/1999 | Kramer et al. . |
| 5,960,825 | 10/1999 | Scancarello et al. .............. 137/543.19 |

FOREIGN PATENT DOCUMENTS

| | | |
|---|---|---|
| 372 154 B1 | 6/1990 | European Pat. Off. . |
| 494590A1 | 7/1992 | European Pat. Off. . |
| 571 715 A1 | 12/1993 | European Pat. Off. . |
| 705 977 A1 | 6/1996 | European Pat. Off. . |
| 7200686 | of 0000 | Germany . |
| 1 129 784 | 5/1962 | Germany . |
| 1142478 | 1/1963 | Germany . |
| 6946784 | 11/1969 | Germany . |
| 1957668 | 5/1971 | Germany . |
| 2410705 | 9/1975 | Germany . |
| 2733089 | 2/1979 | Germany . |
| 3305791 A1 | 8/1984 | Germany . |
| 3813539C2 | 11/1988 | Germany . |
| 3909531A1 | 6/1990 | Germany . |
| 3940099A1 | 6/1991 | Germany . |
| 4125123A1 | 2/1992 | Germany . |
| 19535079 | 4/1996 | Germany . |
| 59-208181 | 11/1984 | Japan . |
| 992232 | 3/1962 | United Kingdom . |
| 1132506 | 11/1968 | United Kingdom . |
| 1409589 | 10/1975 | United Kingdom . |
| 2018364 | 10/1979 | United Kingdom . |
| 2044365 | 10/1980 | United Kingdom . |
| 2083566 | 3/1982 | United Kingdom . |
| 2 165 317A | 4/1986 | United Kingdom . |
| 2171465 | 8/1986 | United Kingdom . |
| 2208 180 | 3/1989 | United Kingdom . |
| 2319569 | 5/1998 | United Kingdom . |

Primary Examiner—Teresa Walberg
Assistant Examiner—Jeffrey C. Pwu
Attorney, Agent, or Firm—Barnes & Thornburg

[57] ABSTRACT

A piston and cylinder air compressor has an induction reed valve including a flat springy reed having end regions which are tiltably supported to hold the reed in closing relationship with an air induction passage of a valve plate whilst permitting deflection and bending of an intermediate region without bending stress at the end regions the valve plate having recesses permitting accompanying tilting of the end regions.

7 Claims, 1 Drawing Sheet

REED VALVE ARRANGEMENT AND GAS COMPRESSOR EMPLOYING A REED VALVE ARRANGEMENT

BACKGROUND AND SUMMARY OF THE INVENTION

This invention relates to a reed valve arrangement and relates especially to a piston and cylinder gas compressor with a reed valve via which gas is drawn during induction strokes.

Piston and cylinder gas compressors have been proposed during the past two decades which include a valve plate located between a cylinder and a cylinder head, the valve plate providing lower and upper surfaces with which springy flat valve reeds are cooperable alternately to close off induction and delivery apertures respectively. Such valve reeds are typically deflectably mounted only at one end so as to be naturally moveable under the influence of gas pressure created by piston movement. Whilst a delivery reed valve is typically mounted at one end and beneath a suitable arrester, on the upper surface of the valve plate, an induction reed is typically clamped at one end between valve plate and cylinder, a free end being constrained by a stop against excessive downward movement away from the valve plate.

A shortcoming of a compressor employing such an induction reed can be attributed to the stiffness of the clamped reed which results in delay in onset of free air delivery to the compressor during an induction stroke. Such delay can be shortened by making the valve reed somewhat thinner and therefore more flexible to permit earlier resilient flexing at the clamped end. However this does not remove the stress at the clamped end whereas it can result in delay in induction valve closure during the subsequent compression or delivery stroke with attendant limitations of compressor performance.

According to the present invention there is provided a reed valve arrangement comprising a naturally flat springy bendable reed having end regions tiltably supported to hold an intermediate region in closing proximity with at least one aperture of a valve plate surface whilst permitting deflection and bending of said intermediate region without bending of the end regions.

According to the present invention there is more particularly provided a piston and cylinder compressor including a valve plate located between the cylinder and a cylinder head said valve plate having induction and delivery passages with respective valve means, the induction valve means comprising a naturally flat springy reed having end regions and an intermediate region extending across the cylinder to cover the induction passage said end regions being tiltably supported between the cylinder and the valve plate to hold the intermediate region in closing relationship with said induction passage whilst permitting deflection and bending of the intermediate region without bending stress of the end regions.

In order that the invention may be more clearly understood and readily carried into effect the same will be further described by way of example with reference to the accompanying drawings:

DETAILED DESCRIPTION OF THE PREFERRED EMBODIMENTS

Further information as to examples of construction of single and multicylinder high efficiency compressors to which the present invention is applicable is given in U.S. patent application Ser. No. 09/129297, which corresponds to United Kingdom Patent Application No. 9807236.6 (K-627).

Figure 1:
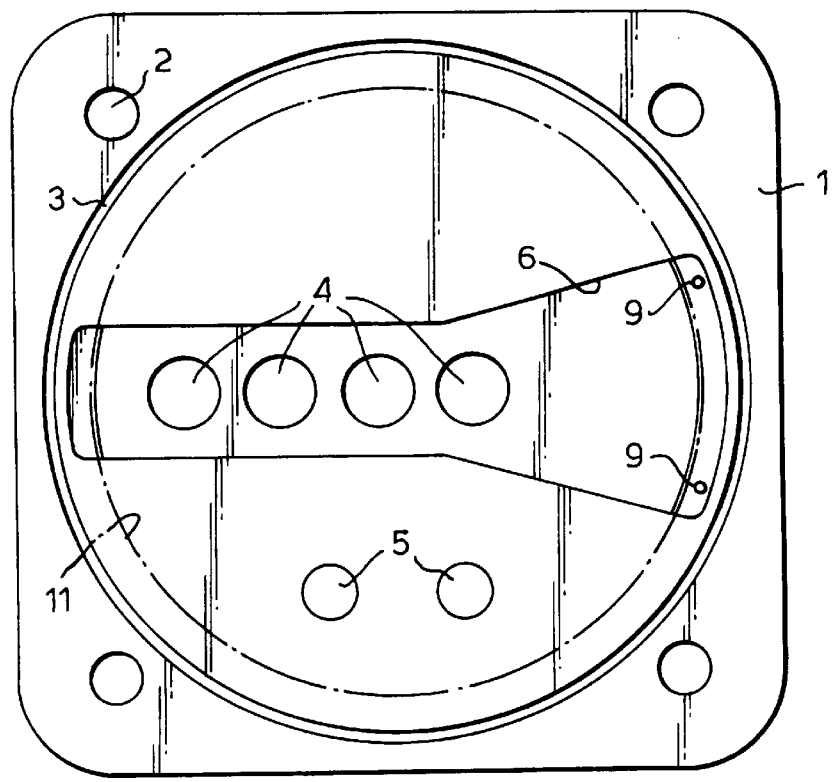
FIG. 1 is an underside diagrammatic view of a valve plate without the induction valve reed of a single cylinder air compressor in accordance with the invention.
Figure 2:
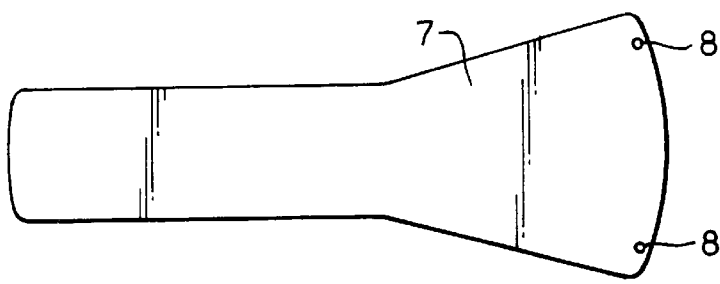
FIG. 2 is an underside view of an induction valve reed for the valve plate of FIG. 1

Referring to FIG. 1, the single cylinder compressor has a conventional cylinder and a crank-driven piston which reciprocates therein to in one stroke induce atmospheric air which it delivers under compression in the subsequent stroke. Induction and delivery reed valves are provided on a rigid valve plate 1 as shown. The valve plate 1 is provided with stud holes 2 to receive cylinder head mounting bolts (not shown) whereby the valve plate is sealingly retained between a cylinder head gasket (not shown) and the cylinder. The valve plate has an annular O-ring groove 3 which houses an O-ring 3a providing sealing between plate 1 and the upper end surface of the cylinder. Diametrically arranged induction passages 4 through the valve plate are shown with two delivery passages 5 disposed to one side thereof. The underside of the valve plate is provided with a shallow mainly planar recess 6 shaped to accommodate a valve reed 7 in the form of a springy metal lamina having a shape as shown in FIG. 2 and having locating apertures 8 by which the lamina is slideably located with some looseness by hard metal pins 9 carried by the valve plate 1. The dimensions of the valve reed recess 6 in relation to the cylinder bore, which is indicated by broken lines 11 in FIG. 1, enable end regions of the reed to extend beyond the bore diameter at each end and to be thereby tiltably located between the cylinder and the valve plate as explained below.

Figure 3:
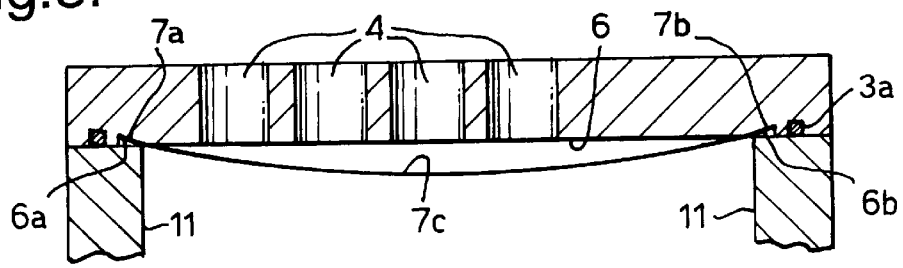
FIG. 3 is a schematic view of a section of the valve plate of FIG. 1 with its induction valve reed and fitted to the cylinder of the compressor and FIG. 4 is an enlarged view of part of FIG. 3.
Figure 4:
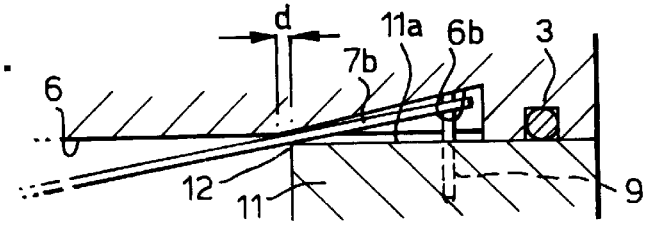

Referring now to FIGS. 3 and 4 wherein the valve plate is shown sealingly engaging the upper surface 11a of cylinder bore 11 it is seen that commencing at a suitable radially inward distance 'd' relative to point of tilt, namely the cylinder bore 11, the ends of the mainly planar recess 6 are further recessed upwards at 6a and 6b whereby the end regions 7a and 7b of reed 7 are each tiltably retained between the cylinder and valve plate. In other words these end regions are positively located but subject to negligible bending during initial pressure difference induced deflection with bending only of the intermediate region 7c. Following a predetermined such downward deflection of the intermediate region 7c from a normal valve closing condition, the upward tilted extremities of the reed 7 come into engagement with the limits of the further recessing 6a and 6b and any further deflection of the intermediate region 7c comes only accompanied by resultant extra restraining bending movements about the points of tilt 12. By such means the invention enables early initial opening of an induction reed valve without subsequent excessive deflection of the intermediate region of an albeit low-rate springy reed, which excessive opening if permitted could delay the subsequent natural closing which is required to occur very near commencement of the compression stroke.

Whilst a reed valve arrangement in accordance with the invention can be of particular benefit when used for an induction valve of a piston and cylinder gas compressor, such a valve arrangement may additionally or alternatively be employed as a delivery valve of such a compressor.

Furthermore, although the reed valve arrangement described utilises a springy generally elongate reed lamina the invention may also be applied to a reed valve having other geometrical configuration. Such configurations may consist say of circular or arcuate planar shapes, the reed again being tiltably supported at an end region or regions permitting limited deflection with bending only of an intermediate region.

Such alternative arrangements can, in common with the described embodiment, offer the advantage of reducing or avoiding stress concentrations at the end region or regions of a valve reed.

What is claimed is:

1. A reed valve arrangement, comprising:

a naturally flat springy reed having end regions tiltably supported about respective tilt-points radially outward of an intermediate region, the intermediate region defining a closing relationship with at least one aperture of a valve surface, and wherein for bending movement of the intermediate region in a direction away from the closing relationship, the end regions are tiltably supported about the respective tilt-points inward from outer extremities of the end region, and wherein the reed valve arrangement further includes spaces accommodating tilting movement of each of the outer extremities about said respective tilt points, thereby permitting bending of the intermediate region but limiting bending in the end regions.

2. A piston and cylinder compressor comprising:

a cylinder;

a cylinder head;

a valve plate located between the cylinder and the cylinder head;

said valve plate having an induction passage with an induction valve means and a delivery passage with a delivery valve means; and the induction valve means comprising a naturally flat, springy reed having two end regions and an intermediate region extending across the cylinder and defining a closing relationship with the induction passage and wherein bending movement of the intermediate region in a direction away from the closing relationship defines an opening relationship of the induction passage and wherein at least one of the two end regions is tiltably supported at a point of tilt radially inward from an outer extremity for tilting movement of the end region about the point of tilt and wherein said valve plate further includes a recess to accommodate said movement, said recess allowing said movement thereby preventing bending stress in the end region.

3. A piston and cylinder compressor as claimed in claim 2 wherein said reed is so tiltably supported at both of said two end regions.

4. A piston and cylinder compressor as claimed in claim 2 or 3, wherein the recesses of said valve plate which accommodate said extremities of said reed impose a limited tilt distance whereby for further movement of the intermediate region beyond that which causes said limited tilt distance, stiffness at the end regions introduces an opposing action additional to the resistance to bending of the intermediate region.

5. A piston and cylinder compressor as claimed in claim 4 wherein said reed is housed in a generally planar recess at a respective inward surface of the valve plate and said limited tilt distance is established by the depth of end region recesses which commence at predetermined inward distance from the respective point of tilt.

6. A piston and cylinder compressor as claimed in claim 2, wherein the recess within which said one end of said valve reed is movable imposes a limited tilt distance whereby for further tilting of the intermediate region beyond that which causes said limited tilt movement, stiffness at the end region introduces an opposing action additional to the resistance to bending of the intermediate region.

7. A piston and cylinder compressor as claimed in claim 6 wherein said reed is housed in a generally planar recess at the respective inward surface of the valve plate and said limited tilt distance is established by the depth of an end region recess which commences at a predetermined inward distance from the respective point of tilt.

* * * * *